March 26, 1935. J. M. CROWE 1,995,670

FRUIT JUICE EXTRACTOR

Filed Jan. 5, 1932

INVENTOR

JOHN M. CROWE

BY Brockett, Hyde, Higley & Meyer

ATTORNEYS

Patented Mar. 26, 1935

1,995,670

UNITED STATES PATENT OFFICE 1,995,670

FRUIT JUICE EXTRACTOR

John M. Crowe, Covington, Ky., assignor to Fruit Juice Machine Company, Cincinnati, Ohio, a corporation of Delaware Application January 5, 1932, Serial No. 584,800

9 Claims. (Cl. 146—3)

My invention relates to a fruit juice extractor and, particularly, to a method and apparatus for extracting the juices from fruits of the citrus variety such as lemons and oranges, and delivering the extracted juice, together with a desired amount of fruit pulp, to a delivery receptacle such as a cup or the like.

One object of my invention is to provide a fruit juice extractor that is simple in construction and efficient in operation and embodies an improved driving connection between the juice extracting means and the power operating means therefor, the driving connection being such as to lend itself readily to the removal of the various operating juice extracting parts of the apparatus to permit easy cleaning or replacement thereof. The driving connection is also such as to lend itself readily to the substitution of other elements to be driven than those forming the juice extracting parts.

Another object of my invention is to provide a fruit juice extractor embodying means for macerating a part of the pulp removed from the fruit and to break up the meat cells of the fruit whereby all of the juice as well as a desired amount of the meat cells of the pulp will be delivered to the delivery receptacle while the undesirable part of the fruit pulp and the seeds will be retained within the extracting machine. This is accomplished, primarily, by providing a means for subjecting the fruit pulp to centrifugal action and, at the same time, subjecting the pulp to a shearing or cutting action.

Figure 1:
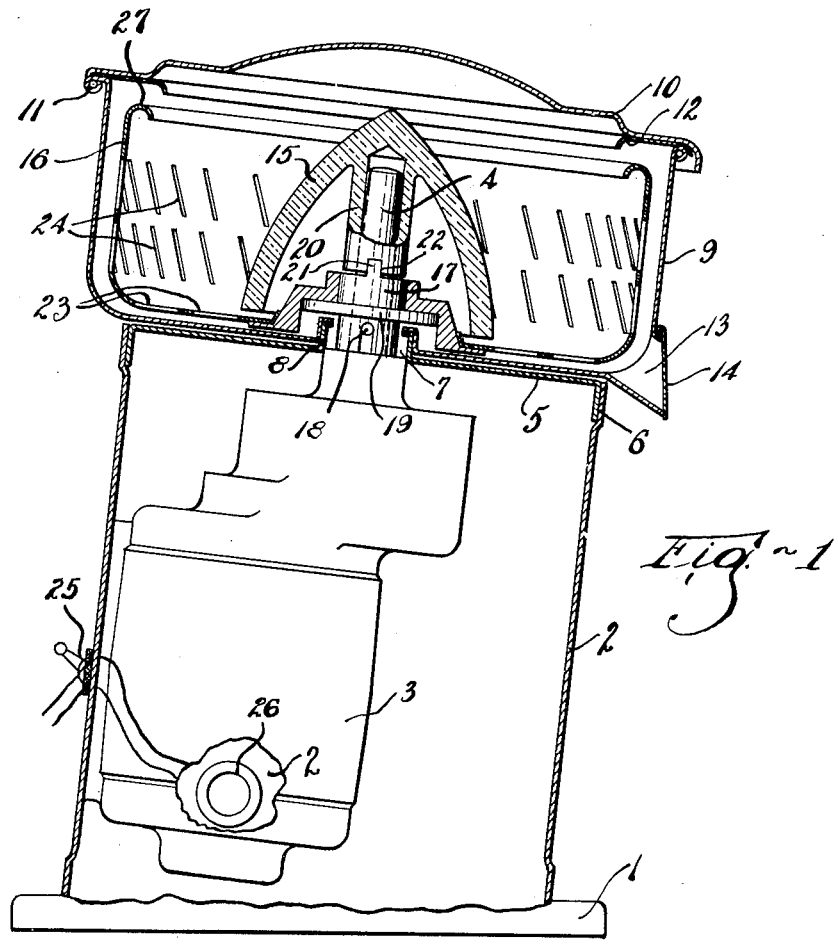
Figure 2:
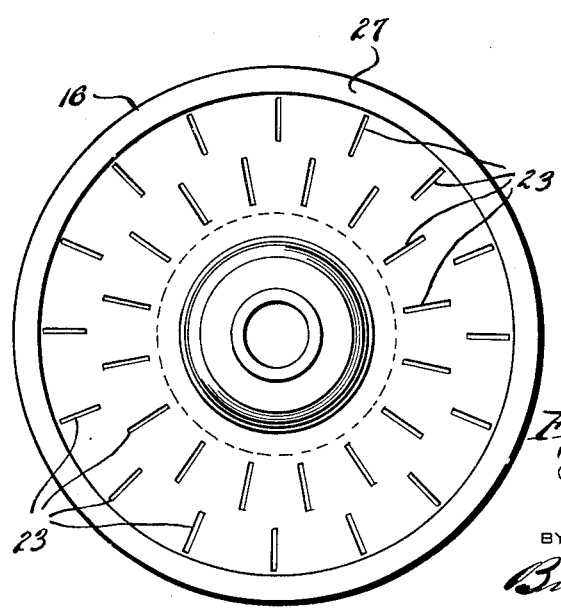
Figure 3:
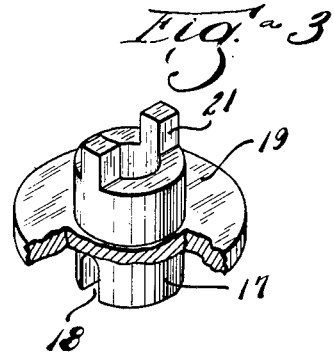

Various other objects and advantageous features of my invention will be seen in the following description and one embodiment thereof may be seen in the accompanying drawing wherein similar characters of reference designate corresponding parts, and wherein:

Fig. 1 is a vertical sectional view showing a fruit juice extracting apparatus constructed in accordance with my invention; Fig. 2 is a plan view of the fruit juice extracting basket forming a part of the apparatus; and Fig. 3 is a perspective view, partly broken away, showing the means for making a driving connection between the power means and the juice extracting parts of the apparatus.

Referring to the drawing, I have shown one embodiment of my invention as comprising a fruit juice extractor embodying a base 1 that supports a cylindrical or other shaped casing 2 in which a motor or power unit 3 is mounted. As shown, the motor or power unit 3 is, in this instance, mounted on and supported by the casing 2 and drives a substantially vertically extending shaft 4 through suitable reduction gearing. The shaft 4 extends through a central opening in a casing cover 5 that interfits with the casing 2 as shown at 6 and is secured thereto by any well known means such as bolts, rivets, or the like.

Surrounding the central opening 7 in the cover 5 through which the shaft 4 extends, the cover 5 is provided with an annular upwardly extending hollow boss, or the like, 8 adapted to interfit with a central opening in the bottom of a casing 9, the casing 9 being adapted to rest on the uppermost end of the boss 8 whereby the casing 9 may be assembled with or removed from the casing 2 at will. Such casing 9 is provided with a cover 10 hingedly mounted as at 11, and a supplemental cover ring 12 that is also hingedly mounted as at 11 and may be moved with or independently of the cover 10. The casing 9 is also provided with a discharge opening 13 and a hinged closure 14 therefor.

In accordance with my invention, the means for removing the juice and pulp from fruit and delivering the juice and the desired quantity of pulp or meat cells to a delivery receptacle consists of a removably mounted bulb 15 of the usual corrugated type, a basket or strainer 16 having perforations therein for subjecting the juice and pulp to centrifugal action and retaining the undesirable parts of the pulp and the seeds in the basket while delivering only the juice and desirable pulp, and a means for making a driving connection between the motor or power unit 3 and the bulb and basket.

This means for making a driving connection between the power unit 3 and the bulb and basket consists of a one-piece member 17 forming a connection of the dental type. As shown, the member 17 is adapted to removably fit over the shaft 4 and be connected thereto so as to rotate therewith by means of a U-shaped slot 18 in the member adapted to fit over a pin 18' extending radially outwardly from the shaft 4. The member 17 is also provided with an annular flange 19 on which the basket 16 is adapted to rest whereby the basket 16 has no positive driving connection with the casting 17 but may be driven by frictional engagement due to the weight of the basket, or the weight of the basket plus the fruit pulp therein. The bulb 15 is provided internally with a sleeve member 20 adapted to fit over the shaft 4 and have driving connection with the member 17 by means of teeth 21 on the upper side of the member adapted to engage grooves 22 in the bottom of the sleeve 20.

With this construction, it will be seen that the bulb 15 is removably mounted in the basket 16 and has a positive driving connection with the shaft 4, whereas the basket 16, while being removably mounted in the casing 9, does not have a positive driving connection with the shaft 5 but is only driven through frictional engagement between the basket and the flange 19 due to the weight of the basket or the basket plus the fruit juice and pulp therein. Likewise, the driving connection means furnished by the member 17 is removably mounted on the shaft 4 and the casing 9 is removably mounted on the casing 2 whereby the bulb 15, basket 16, member 17, and casing 9 may all be removed from the shaft 4 and easily disassembled for cleaning or replacement purposes.

Referring to Figs. 1 and 2, the basket 16 is provided with radial slots 23 in its bottom portion through which fruit juice and small portions of the pulp may flow into the casing 9 and thence into a delivery receptacle through the discharge opening 13. Also, the side walls of the basket 16 are provided with substantially elongated slots 24 that are disposed diagonally to the axis of the basket and preferably extend in a direction toward the direction of any rotation of the basket that occurs through the frictional contact hereinbefore described. A double row of these substantially elongated slots 24 is provided in the side wall of the basket with each slot in one row in staggered relation with its adjacent slot in the other row, and all slots are preferably inclined in the same direction as shown.

In the operation of the device, it will be noted that the casing 2, the casing 9, and the operating juice and pulp extracting parts are constructed to place the casing 9 at an angle to the horizontal with the discharge opening 13 at the lowest side whereby juice and pulp or meat cells passing from the basket 16 will readily flow out of the discharge opening 13 by gravity. The construction is simplified by having the side walls of the casing 2 substantially parallel to the axis of the rotating parts. The motor or power unit having been placed in operation as by operation of a suitable switch 25 and its speed of operation adjusted as by means of a suitable rheostat means or the like 26 to rotate the corrugated bulb 15, and the basket 16 through the frictional connection hereinbefore described, the cover 10 is raised and a half-section of fruit is pressed onto the bulb 15 in the well known manner. The supplemental cover 12 is left in closed position and serves to protect the operator's hand from injury by the basket 16 when such basket is rotating.

The fruit being held stationary, the rotating bulb 15 removes the juice and meat cells therefrom whereby they flow into the basket 16 which rotates through the frictional connection hereinbefore described to separate the juice from the meat cells and pulp of the fruit by centrifugal action, the juice and fine portions of the pulp or meat cells flowing out of the basket and into the casing 9 through the slots 23 and 24 and the larger and undesirable portions of the pulp and the seeds being retained in the basket. The larger portions of the pulp and the seeds are held in the basket 16 against the normal upward flow caused by rotation of the basket by the inturned overhanging top 27 of the basket. The juice and pulp flows from the casing 9 through the discharge opening 13 by gravity, and the device may be operated as long as it is desired to extract juice and meat cells or pulp from fruit.

With the above construction, I have provided a fruit juice extractor embodying numerous novel and advantageous features. One novel and advantageous feature resides in the provision of elongated slots in the side wall of the extractor basket, with these slots inclined at an angle to the axis of the basket and in a direction toward the direction of rotation of the bulb 15 and driving member 17 and thus the normal direction of any rotation of the basket through the frictional connection hereinbefore described.

With such disposition of the slots, the fruit pulp and meat cells, which tend to travel upwardly along the inner walls of the basket on rotation of the basket, are forced downwardly by the inclined slots thus producing a shearing action on the pulp and meat cells to release any juice therein and cut a portion of the pulp and meat cells into particles fine enough to pass through the slots 23 and 24 and thence to the delivery receptacle with the extracted juice. Since it is well known that the pulp and meat cells have a definite food value, such slots are important in that they permit the desirable pulp and meat cells to be delivered while the basket is effective to retain the undesirable pulp and seeds.

A further advantageous feature of my invention resides in the fact that the basket 16 is not positively driven and is only rotated through frictional engagement with the driving member 17. Thus, the basket 16 may continue to rotate after the motor or power unit and bulb 15 have been stopped which will be effective to extract juice that would otherwise remain in the pulp in the basket. A still further feature resides in the fact that all operative parts with the possible exception of the motor or power unit are readily removable for cleaning, renewal, or repair. Various other features will be readily apparent.

What I claim is:

1. A fruit juice extractor comprising a base, a casing mounted on said base and having a discharge opening, a removable strainer mounted for rotation within said casing, and a corrugated fruit pulp removing bulb disposed in said strainer, said strainer having elongated slots in its bottom and elongated slots in its side walls with the last named slots inclined to the axis of the strainer and in the same direction as the normal direction of rotation of said strainer whereby rotation of said strainer to subject fruit therein to a centrifugal action will subject the fruit to a shearing action.

2. A fruit juice extractor comprising a base, a casing mounted on said base and having a discharge opening, a removable strainer mounted for rotation within said casing, and a corrugated fruit pulp removing bulb disposed in said strainer, said strainer having elongated slots in its bottom and elongated slots in its side walls with the last named slots inclined to the axis of the strainer and in the same direction as the normal direction of rotation of said strainer whereby rotation of said strainer to subject fruit therein to a centrifugal action will subject the fruit to a shearing action, there being a plurality of rows of slots in said side walls with the slots of one row staggered relative to the slots in the next adjacent row.

3. A fruit juice extractor comprising a base, a casing mounted on said base and having a discharge opening, a removable strainer mounted for rotation within said casing, a removable corrugated fruit removing bulb disposed in said strainer, a motor means for rotating said bulb, and a removable driving connection between said motor means and said bulb, said strainer being loosely supported on said removable driving connection whereby the only driving connection therebetween is by friction due to the weight of the strainer or the weight of the strainer plus the contents thereof.

4. A fruit juice extractor comprising a base, a casing removably mounted on said base and having a discharge opening, a removable strainer mounted for rotation within said casing, a removable corrugated fruit removing bulb disposed in said strainer, a motor means for rotating said bulb, and a removable driving connection between said motor means and said bulb, said strainer being loosely and removably supported on said driving connection whereby the only driving connection therebetween is by friction due to the weight of the strainer or the weight of the strainer plus the contents thereof.

5. A fruit juice extractor, comprising a base, a motor carried thereby, a juice receiving member mounted on said base and having a discharge opening, a drive means from said motor extending into said juice receiving member, a fruit juice and pulp removing bulb loosely mounted on said drive means within said juice receiving member, a removable drive connection between said drive means and said bulb, and a rotatable strainer means, said strainer means being removably mounted within said juice receiving member and being loosely supported on said drive means.

6. A fruit juice extractor, comprising a base, a motor carried thereby, a juice receiving member mounted on said base and having a discharge opening, a drive means from said motor extending into said juice receiving member, a fruit juice and pulp removing bulb loosely mounted on said drive means within said juice receiving member, a removable drive connection between said drive means and said bulb, and a rotatable strainer means, said strainer means being removably mounted within said juice receiving member and being loosely supported on said removable driving connection.

7. A fruit juice extractor, comprising a base, a motor carried thereby, a juice receiving member mounted on said base and having a discharge opening, a drive means from said motor extending into said juice receiving member, a fruit juice and pulp removing bulb loosely mounted on said drive means within said juice receiving member, a removable drive connection between said drive means and said bulb, and a rotatable strainer means, said strainer means being removably mounted within said juice receiving member and being loosely supported on said drive means, and having elongated slots in its bottom and elongated slots in its side walls.

8. A fruit juice extractor, comprising a base, a motor carried thereby, a juice receiving member mounted on said base and having a discharge opening, a drive means from said motor extending into said juice receiving member, a fruit juice and pulp removing bulb loosely mounted on said drive means within said juice receiving member, a removable drive connection between said drive means and said bulb, and a rotatable strainer means, said strainer means being removably mounted within said juice receiving member and being loosely supported on said drive means, and having elongated slots in its bottom and elongated slots in its side walls, with the last named slots inclined to the axis of the strainer and in the same direction as the normal direction of rotation of said strainer whereby rotation of said strainer to subject fruit therein to a centrifugal action will subject the fruit to a shearing action.

9. A fruit juice extractor comprising a base, a casing mounted on said base and having a discharge opening, a strainer mounted for rotation within said casing, and a fruit pulp removing bulb disposed in said strainer, said strainer having in its side walls elongated slots inclined to the axis of rotation of the strainer and in the same direction as the normal direction of rotation of said strainer whereby rotation of said strainer to subject fruit therein to a centrifugal action will subject the fruit to a shearing action.

JOHN M. CROWE.